United States Patent
Wright et al.

(10) Patent No.: US 10,193,923 B2
(45) Date of Patent: *Jan. 29, 2019

(54) METHODS FOR PREVENTING CYBER INTRUSIONS AND PHISHING ACTIVITY

(71) Applicant: Duo Security, Inc., Ann Arbor, MI (US)

(72) Inventors: Jordan Wright, Ann Arbor, MI (US); Jon Oberheide, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,361

(22) Filed: Jul. 12, 2017

(65) Prior Publication Data

US 2018/0027013 A1    Jan. 25, 2018

Related U.S. Application Data

(60) Provisional application No. 62/364,745, filed on Jul. 20, 2016.

(51) Int. Cl.
    *H04L 29/06*      (2006.01)
    *H04L 29/12*      (2006.01)
    *G06F 17/30*      (2006.01)

(52) U.S. Cl.
    CPC ...... *H04L 63/1483* (2013.01); *H04L 61/1511* (2013.01); *H04L 61/301* (2013.01);
(Continued)

(58) Field of Classification Search
    CPC ......... H04L 63/1483; G06F 2221/2119; G06F 17/30864
    See application file for complete search history.

(56) References Cited

U.S. PATENT DOCUMENTS 7,451,487 B2 * 11/2008 Oliver .................... G06F 21/51
                                                           709/206
8,307,431 B2    11/2012  Krishnamurthy et al.
(Continued)

OTHER PUBLICATIONS dnstwist: Added experimental fuzzing algorithm: dictionary + Rearranged files/dirs; Oct. 14, 2015; retrieved on Aug. 30, 2017 @ https://github.com/elceef/dnstwist/commit/713e3fc9854b0ec239e98cc36b755c489357b4a0.*

(Continued)

*Primary Examiner* — James R Turchen
(74) *Attorney, Agent, or Firm* — Jeffrey Schox; Padowithz Alce

(57) ABSTRACT

Systems and methods for mitigating cyber intrusions includes: receiving target domain input, wherein the target domain input comprises a domain name associated with a target entity or target entity data that is useable to generate phishing attack domain names; using the target domain name input to generate the phishing attack domain names, wherein the phishing attack domain names include a plurality of domain names each having a phishing value comprising a likelihood or a probability of being used in a phishing campaign against the digital resources, where the likelihood or the probability satisfies a predetermined phishing value threshold; arranging the phishing attack domain names in a hierarchical order; and implementing one or more digital resources security protocols that mitigates the likelihood or the probability that selected domain names of the phishing attack domain names may be used in the phishing campaign against the digital resources.

20 Claims, 5 Drawing Sheets

(52) U.S. Cl.
CPC .... *H04L 63/1416* (2013.01); *G06F 17/30864* (2013.01); *G06F 2221/2119* (2013.01)

(56) References Cited

U.S. PATENT DOCUMENTS

| | | |
|---|---|---|
| 8,484,741 B1 | 7/2013 | Chapman |
| 8,516,581 B2 | 8/2013 | Hsu et al. |
| 8,578,166 B2 | 11/2013 | De Monseignat et al. |
| 8,578,481 B2 | 11/2013 | Rowley |
| 8,608,487 B2 | 12/2013 | Huie et al. |
| 8,707,426 B1 | 4/2014 | Ramzan et al. |
| 8,832,774 B2 | 9/2014 | Nestler et al. |
| 8,839,369 B1 | 9/2014 | Dai et al. |
| 9,065,850 B1 | 6/2015 | Sobrier |
| 9,118,704 B2* | 8/2015 | Miller ................. H04L 63/1416 |
| 9,160,766 B2 | 10/2015 | Kashyap et al. |
| 9,218,482 B2 | 12/2015 | Ma et al. |
| 9,270,646 B2 | 2/2016 | Shelest |
| 9,276,956 B2 | 3/2016 | Geng et al. |
| 9,282,117 B2 | 3/2016 | Schmidtler |
| 9,489,513 B1* | 11/2016 | Mesropian ............ G06F 21/566 |
| 9,501,746 B2 | 11/2016 | Prakash |
| 9,516,058 B2 | 12/2016 | Antonakakis et al. |
| 9,621,566 B2 | 4/2017 | Gupta et al. |
| 2006/0123478 A1* | 6/2006 | Rehfuss ............. H04L 63/1408 726/22 |
| 2007/0131865 A1* | 6/2007 | Lawrence ............ G06F 21/554 250/363.1 |
| 2007/0136806 A1* | 6/2007 | Berman .............. G06Q 10/107 726/22 |
| 2007/0283000 A1* | 12/2007 | Proux ..................... H04L 51/12 709/224 |
| 2008/0092242 A1* | 4/2008 | Rowley ............... H04L 63/1483 726/27 |
| 2008/0172741 A1* | 7/2008 | Reumann ........... H04L 63/1441 726/23 |
| 2008/0250159 A1* | 10/2008 | Wang ................. G06F 21/6218 709/239 |
| 2009/0106557 A1* | 4/2009 | Leonard ................. H04L 51/12 713/179 |
| 2010/0132016 A1 | 5/2010 | Ferris |
| 2010/0186088 A1* | 7/2010 | Banerjee ................ G06F 21/51 726/23 |
| 2011/0276716 A1* | 11/2011 | Coulson ............ G06F 17/30887 709/238 |
| 2014/0115704 A1* | 4/2014 | Miller ................. H04L 63/1416 726/23 |
| 2014/0331119 A1* | 11/2014 | Dixon ................... H04L 63/168 715/234 |
| 2015/0052053 A1 | 2/2015 | Howe |
| 2015/0156210 A1* | 6/2015 | Hunt ................... H04L 63/1408 726/23 |
| 2015/0281244 A1 | 10/2015 | Wen |
| 2016/0055490 A1* | 2/2016 | Keren .................... G06Q 30/00 705/14.47 |
| 2016/0063541 A1* | 3/2016 | Geng ................. H04L 63/1483 705/14.47 |
| 2017/0013008 A1 | 1/2017 | Carey et al. |
| 2017/0078321 A1* | 3/2017 | Maylor ............... H04L 63/1433 |
| 2017/0353483 A1* | 12/2017 | Weith ................. H04L 63/1433 |

OTHER PUBLICATIONS

URLCrazy; Andrew Horton; Morningstar Security; Jul. 2012; retrieved on Aug. 30, 2017 @ https://www.morningstarsecurity.com/research/urlcrazy.*

Domain Typo Finder; by Domain Tools; Sep. 9, 2015; retrieved on Aug. 30, 2017 @ https://web.archive.org/web/20150909015047/http://research.domaintools.com/buy/domain -typo-finder/.*

Helfrich, J.N. and Neff, R., Oct. 2012. Dual canonicalization: An answer to the homograph attack. In eCrime Researchers Summit (eCrime), 2012 (pp. 1-10). IEEE. (Year: 2012).*

Unicode Consortium, 2008. Unicode Technical Report# 36: Unicode Security Considerations. (Year: 2008).*

Unicode Consortium, 2010. Unicode Technical Report# 39: Unicode Security Mechanisms. (Year: 2010).*

Ethical Hacking. "How to create fake or Phishing Web page for Gmail." Nov. 23, 2010. Https://breakthesecurity.cysecurity.org/2010/11/how-to-create-fake-or-phishing-web-page-for-gmail.html. Accessed on Jul. 5, 2017. 4 pages.

* cited by examiner

Target Domain Name example.com

Attack Domain Names

| Register? | Name | Price | Risk Level |
|---|---|---|---|
| ● | examplee.com | $200 | Medium |
| ● | exampl3.com | $2000 | High |
| ○ | exam-ple.com | $1000 | Medium |
| ○ | exsample.com | $300 | Low |

SUBMIT

FIGURE 5

METHODS FOR PREVENTING CYBER INTRUSIONS AND PHISHING ACTIVITY

CROSS-REFERENCE TO RELATED APPLICATIONS

This application claims the benefit of U.S. Provisional Application No. 62/364,745, filed 20 Jul. 2016, which is incorporated in its entirety by this reference.

TECHNICAL FIELD

This invention relates generally to the computer security field, and more specifically to a new and useful method for preventing phishing activity.

BACKGROUND

Computer security vulnerabilities come in all shapes and sizes; resultantly, computer security strategy must be varied and diverse to protect against exploitation of those vulnerabilities. Phishing is a particularly interesting challenge for computer security implementation because it is not solely a technological problem, as phishing relies on exploitation of a vulnerability not easily rectified—human weakness.

Attackers commonly register "lookalike" domain names that are similar to a target domain name associated with an organization that an attacker is trying to phish. For example, a lookalike domain for "priceline.com" might substitute one character for another similar-looking character (e.g. "priceline.com"). "Lookalike" domain names can fool individuals into believing that content from those domains is legitimate, and in turn expose serious security issues.

While computer network users can be trained to recognize and report phishing attacks, it is difficult for such training to result in sufficient protection; after all, only one user's mistake is needed for a phishing attack to succeed.

Thus, there is a need in the computer security field to create new and useful methods for preventing phishing activity and related cyber intrusions. This invention provides such new and useful methods.

BRIEF DESCRIPTION OF THE FIGURES

FIG. 5 is an example user interface presenting attack domain name information in a variation of a method of a preferred embodiment.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Preventing Phishing Activity

Figure 1:
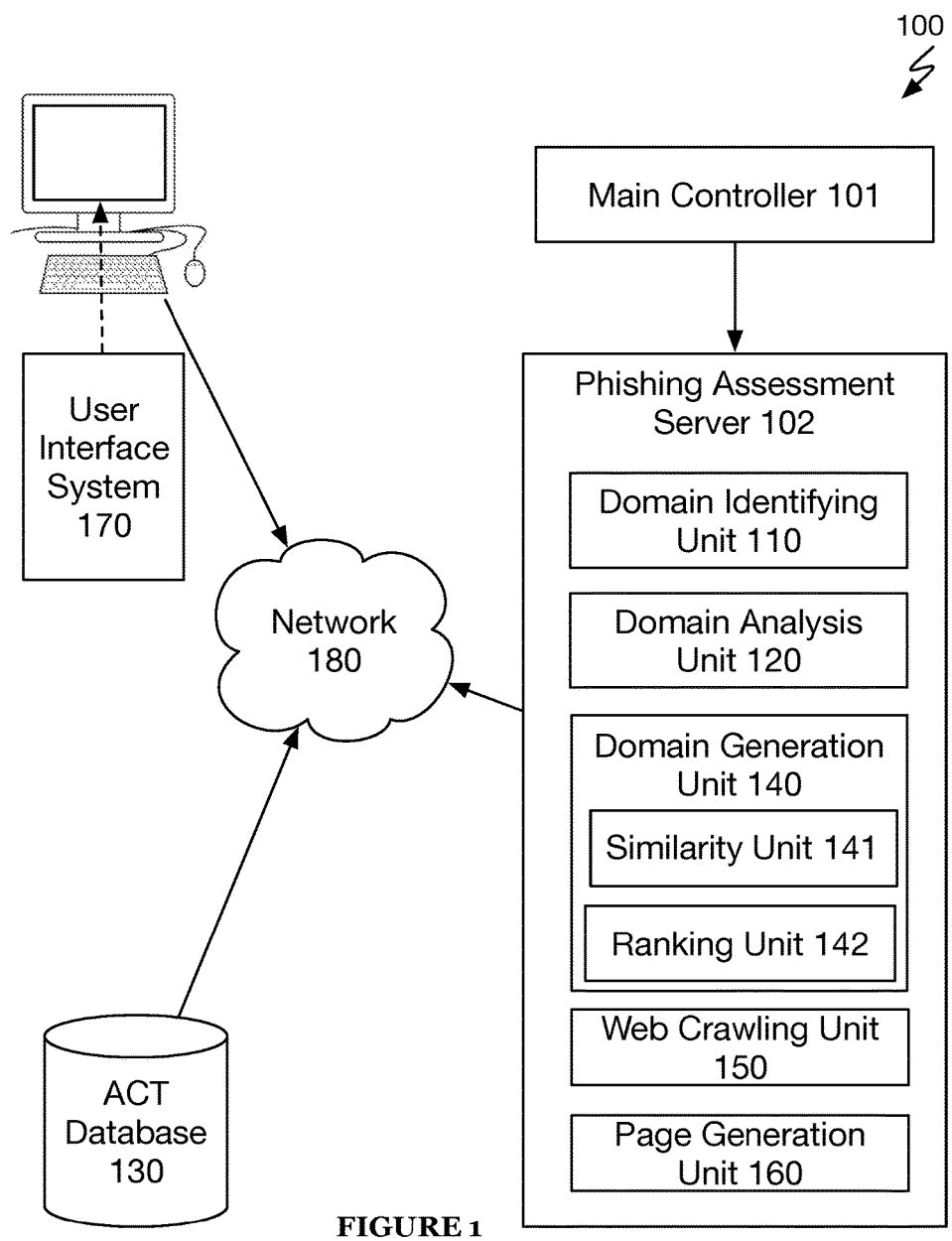
FIG. 1 illustrates a schematic representation of a system in accordance with one or more embodiments of the present application.

As illustrated in FIG. 1, a system 100 for implementing phishing risk analysis includes a phishing assessment server 102, target domain name identifying unit 110 (identifying unit 110), target domain name analysis unit 120 (analysis unit 120), auxiliary characters and TLD database 130, pseudo domain name generation unit 140 (generation unit 140), web crawling unit 150, fictitious web page generation unit 160 (page generation unit 160), user interface and input system 170, and network 180. Additionally, the generation unit 140 may include a domain name similarity determination (likeness) unit 141 and a pseudo domain name ranking unit 142.

Each of the units described herein including the identifying unit 110, analysis unit 120, generation unit 140, page generation unit 160, and the like include a computer processing unit (CPU), a processing circuit, microcontroller, or the like and alternatively, in some embodiments, are implemented by a CPU, processing circuit, microcontroller, or a main controller 101 that executes computer-executable code for performing the functions of each of the fore-mentioned unit components of the system 100. The main controller, in some embodiments, is a computer hardware component having a computing chip operable coupled to or in communication with memory. The main controller interfaces with and/or links one or more or all of the components or devices of system 100. In a preferred embodiment, the main controller controls or manages operations of each of the unit components and other devices operated by system 100. Additionally, in the embodiments when the processor or controller executes the computer code for implementing the respective unit components of the system 100, the processor or controller effectively mimics or functions as each of the respective unit components of system 100.

Additionally, and/or alternatively, each of the identifying unit 110, analysis unit 120, generation unit 140, and page generation unit 160 may be a separate component or element in system 100. However, it shall be understood that each of these unit components of system 100 may be part of a single component, such as the phishing assessment server 102 or software components of a main controller or computer processor.

The phishing assessment server 102 of a preferred embodiment automatically and/or semi-automatically implements one or more phishing campaigns or assessments on one or more computer networks, computer network users, and/or computer network devices. That is, the phishing assessment server 102, in such embodiment, is able to perform automatically and without human intervention some or all of the functions described herein and, especially, those described in each of the methods and processes disclosed in the present application. For instance, once a target entity is identified, the phishing server 102 in combination with the unit components and devices of system 100 (e.g., the phishing assessment platform) is able to identify a target domain name, generate pseudo domain names, rank and register one or more of the pseudo domain names, fabricate fictitious website for the pseudo domain names, and implement a phishing campaign or assessment.

Additionally, and/or alternatively, the phishing assessment server 102 may be an IT computer with functionality or sufficient computing ability to implement phishing assessments on a computer network. Additionally, and/or alternatively, the phishing assessment server 102 may be one of a plurality of computers and servers that form part of a target computer network or another network. In one variation, the phishing assessment server 102 is a central server operable to control, manage, and/or access one or more additional servers and computers existing one or more networks. Alternatively, phishing assessment server 102 may be distinct and independent from the target computer network. The target computer network of a preferred embodiment is the computer network that is subject to the phishing risk assessment. Accordingly, phishing assessment server 102 may be maintained and/or operated by an entity associated with the target computer network or maintained and/or operated by a third-party service provider to the entity associated with the target computer network.

The phishing assessment server 102 may be specifically configured to perform any of the processes (automatically or semi-automatically) described herein including of the various methods described in the present specification.

In a preferred embodiment, after receiving an identification of a target computer network, target user(s), and/or a target entity name for implementing the phishing campaign against, the target domain name identifying unit 110 is able to automatically or in response to, identify one or more target domain names to perform the phishing campaign against. For example, identifying unit 110 may receive from an IT administrator or the like, a target entity name, such as a target business name as input. In such example, using the business name, the identifying unit 110 is able to determine or identify a target domain name to assert the phishing campaign against.

In other embodiments, the identifying unit 110 may be provided with the one or more target domain names for which a phishing campaign is applied against. In this case, the one or more target domain names maybe pre-stored on a memory device accessible to the identifying unit 110. Additionally, and/or alternatively, the identifying unit 110 may receive as input the one or more target domain names from an IT administrator or the like that is authorized to implement a phishing campaign.

In the target domain name identification processes of the identifying unit 110, after receiving the target entity name or the like, the identifying unit 110 may search a number of different resources for identifying any and all possible domain names affiliated or otherwise, associated with the target entity. In particular, the identifying unit 110 identifies active domain having all, part, or a known abbreviated of the target entity name. The identifying unit 110, if provided access, searches entity-maintained or provided resources, such as entity-servers and computer networks of the target entity to identify domain names associated with the target entity. Additionally, and/or in combination therewith, the identifying unit 110 may search the Internet and/or domain name registration sites to identify one or more domain names associated with or being used by the target entity or otherwise, associated with the target entity name.

The result of the identifying unit 110's search of domain names may be the identification of one or a plurality of domain names which may be associated with the target entity or target computer network for the purposes of using one of these identified target domain names in a phishing campaign. In the case that there are a plurality or multiple domain names associated target entity or computer network that are discovered by the identifying unit 110, the identifying unit 110 determines a popularity of use of each of the identified plurality of domain names based on an aggregate number of visits and/or use of each of the plurality of domain names during a period of time. The identifying unit 110 may then identify a rank order for the plurality of domain names based on popularity and/or visits. The period of time may be any period of time in the past or an evaluation period of time in which the identifying unit 110 identifies a period of time in which the identifying unit 110 will measure the usage and/or visits to each of the plurality of domain names. From the evaluation period, the identifying unit 110 is able to determine aggregate usage and/or aggregate visits to each of the plurality of domain names and determine a ranking of the plurality of domain names based on these values. The identifying unit 110 of a preferred embodiment selects the top domain name of the plurality of identified domain names as the target domain name. Of course, it shall be understood that if the phishing assessment is a multi-domain name phishing assessment, then the identifying unit 110 would select the most popular domain names by rank for implementing the multi-domain name phishing assessment. A multi-domain name phishing campaign or assessment may be run simultaneously or sequentially. In a simultaneous multi-domain name phishing campaign, the multiple target domain names of the target entity are implemented in a phishing assessment at a same time. In a sequential multi-domain name phishing campaign, the multiple target domain names of the target are implemented in a phishing assessment in a sequential order and in some embodiments, the sequential order of implementation is based on rank or target domain name popularity.

Once the identifying unit 110 has identified and/or ranked the one or more domain names, the identified one or more domain names is shared or otherwise, becomes accessible to the target domain name analysis unit 120. For simplicity of explanation, the manner in which the analysis unit 120 processes a single identified domain name is described in the following; however, it shall be understood that any number of identified domain names may be analyzed by the analysis unit 120. The analysis unit 120 of a preferred embodiment analyzes one or more features and attributes of an identified domain name. In particular, the analysis unit 120 of a preferred embodiment analyzes each of the second-level domain (SLD) portion and the top-level domain (TLD) portion of the identified domain name to identify each of the characters in the SLD and TLD. For example, in the domain name: Example123.net/domain, the analysis unit 120 identifies each of the letters in the term "Example," each of the numbers "123," and the TLD "net," and also each of the letters in the suffix of the TLD, "domain." It shall be understood that the analysis unit 120 may analyze any portion of a URL including, but not limited to, the SLD, TLD, and pre-fixes and suffixes thereof.

Additionally, and/or alternatively, subsequent to or contemporaneously with the identification of the characters in the identified domain name, the analysis unit 120 further evaluates each of the characters in the SLD and/or TLD to determine whether or not the identified characters in the SLD and/or TLD has a known or recognized comparable character. The comparable character is a like or similar character that has an appearance comparable to an identified character in the SLD and/or TLD. For instance, the characters "vv" would be a comparable character for the letter "w." In many instances, if the characters "vv" has a substantially similar appearance to the letter "w" and thus, if the characters "vv" were substituted for the letter "w" in a term in a domain name, it would be very difficult to differentiate the two.

In the evaluation process of the identified characters in the identified domain name, the analysis unit 120 of a preferred embodiment compares each of the identified characters to one or more characters stored in auxiliary characters and TLD database (ACT database) 130 (e.g., pseudo domain name database) to determine whether any of the characters of the identified domain name has an associated visually similar corresponding character in the ACT database. Upon completion of the comparison, the analysis unit 120 transmit a communication to the pseudo domain name generation unit 140 indicating each of the characters in the identified target domain name which has a corresponding visually similar character within the ACT database 130 together with an indication of which visually similar characters in the ACT database 130 that corresponds to the characters in the target domain name. The ACT database 130 is, preferably, a database that includes characters including letters, numbers, and symbols (e.g., any character reproducible using an input device) that are electronically linked or otherwise associated with other and/or different characters which share a visual appearance that is similar. Depending on a selected or identified domain name transformation process, the visually similar characters which are electronically associated with original characters are used as substitutes for original characters appearing in a target domain name. The ACT database 130, in a variation, also includes common variations of words and/or characters that often appear in domain names. For instance, if the term "example" is a term that typically appears in domain names, the ACT database 130 will have one or more common variations of this term, such as example or example. These variations would be stored in the ACT database 130 in order to more efficiently process a pseudo domain name generation request for frequently appearing terms in domain names.

Referring back to the example described above involving "Example123.net/domain," in the ACT database 130, the character "l" in the domain name may be linked or associated with the character "t" because these two characters share a visual similarity and when "t" is substituted into the domain name, upon brief visual inspection, the modified domain name Exampte123.net/domain looks the same as the original domain name. Similarly, the character "m" may be substituted with the linked or associated characters "rn" in the ACT database 130 and the character "a" may be associated or linked with the character "@" or the like. Each character may be associated with one or a plurality of visually similar other characters in the ACT database 130. Thus, the analysis unit 130 is able to input each of the identified characters of the identified domain name into a comparison process involving the data in the ACT database to determine character comparable or simply input into the identified characters into the ACT database 130 and comparable characters would be returned as output from the ACT database 130.

A similar process may, preferably, be employed for identifying comparable or substitute TLDs. In many cases, TLDs do not have visually similar TLDs. Rather, since the TLD is usually located at the end of a domain name, many TLDs may simply be substituted for other commonly used TLDs. Thus, in the case of identifying a substitute TLD for a TLD of an identified domain name, the analysis unit 120 may search the ACT database for the most commonly used TLDs other than the current TLD of the identified domain name. In some instances, the most commonly used TLDs in the ACT database 130 may be identified as TLDs with the highest global popularity (e.g., .com, .net, .org, and the like). In other circumstances, the most commonly used TLDs may be based on the entity type. For instance, for educational entities, the TLD .edu is often used; however, if the subject of a phishing campaign is an educational entity that is partly government funded, a most commonly used TLD may be .gov since many government-based entities use the TLD .gov. Thus, the analysis unit 130 may identify comparable or substitute TLDs based on, at least, these two basis.

Accordingly, after comparing each of the identified characters in the identified domain name, the analysis unit 130 identifies a comparable character for each of or one or more of the characters in the identified (e.g., target domain name) domain name. That is, a result of the analysis by the analysis unit 130 may be a catalog (e.g., SLD catalog) or list of each of or one or more of the characters in the identified domain name corresponding to one or more comparable characters from the ACT database. Similarly, a catalog (e.g., TLD catalog) identifying corresponding TLDs to the current TLD of the identified domain name may be provided. In some embodiments, the corresponding comparable characters and TLDs are ranked in the respective catalogs based on closest similarity to a character and/or TLD in the target domain name. This allows for generating more similarly appearing pseudo domain names at the pseudo domain name generation unit 140, as discussed in more detail below.

The pseudo domain name generation unit 140 is, preferably, configured to generate one or more fictitious or attack domain names (e.g., pseudo domain names) based on the identified target domain name. The pseudo domain names are, in this application, illegitimate domain names imitating legitimate target domain names. In particular, the target domain name in a preferred embodiment is provided to or received by the generation unit 140 and upon receipt or in response to the identification of the target domain name, the generation unit 140 continues to generate a list of pseudo domain names that could be used in a phishing campaign. In a preferred embodiment, the generation unit 140 generates the pseudo domain names based on an identification of the target domain name, an SLD catalog for the target domain name, and a TLD catalog for the target domain name.

In the pseudo domain name generation process, the generation unit 140 generates multiple iterations of pseudo domain names based on the identified target domain name. In some embodiments, the generation unit 140 modifies the target domain name to arrive at a pseudo domain name. In other embodiments, the generation unit 140 generates an entirely new pseudo domain name on the basis of the target domain name.

The pseudo domain name generation process at the generation unit 140 is preferably further based on one or a combination of domain name modification processes. Specifically, the generation unit 140 selects one or more of a homoglyph transformation process, TLD alternation/modification process, generic or service-specific prefix/suffix augmentation process, character repositioning and spacing, character transposition process, character deletion, and/or a combination thereof.

In the homoglyph transformation process implemented at the generation unit 140, the generation unit 140 transforms or modifies, mainly, the second-level domain portion of the target domain name to generate a pseudo domain name with one or more characters, mainly, in the second-level portion of the pseudo domain that that are not the same as corresponding characters in the target domain name, but that have a visually similar appearance such that when viewed at-a-glance the target domain name and the pseudo domain name appear visually the same. That is, the characters in the pseudo domain name appear to match 1-for-1 with the characters of the target domain name although the characters in the pseudo domain name are different than the characters in the target domain name. This type of homoglyphic domain name is achieved primarily by substituting at least one letter or character in the target domain name with one character or a character combination that appears to be visually similar to the at least one letter. Similar transformations can be achieved with several of the above-listed pseudo domain name generation processes.

The TLD alternation/modification process involves the substitution of the TLD of the target domain name with an alternative TLD or a modification of the TLD. For example, a TLD modification of example.com/html-1 may be example.com/html-2. In this example, the main portion of the TLD (e.g., com) is not change, however, one or more other characters in the TLD (e.g., change from html-1 to html-2) is changed. In many instances, the generation unit 140 uses characters and/or words in the pre-fix and suffix augmentation processing of a target domain name that would otherwise appear to be a natural extension of the original terms or characters in the second-level domain portion of the target domain name.

Implementing the generic or service-specific prefix/suffix augmentation process at the generation unit 140 primarily includes modifying the second-level domain portion of the target domain name; however, it should be noted that this process can easily be applied to the TLD of the target domain name as well. Specifically, in this process, the generation unit 140 adds one or more characters immediately before (e.g., pre-fix) the characters in the second-level domain portion or immediately after (suffix). For example, in an example target domain name, such as bankofamerica.com, it would be a natural extension of the target domain name to add "onlinebanking" as a prefix because many target users may access the target domain name to login into online banking. The resulting attack domain name would, therefore, be onlinebanking-bankofamerica.com.

In the character repositioning and spacing processes, the generation unit 140 modifies the target domain name to change slightly the spacing or positioning of the characters in the target domain name. For instance, the generation unit 140 may add an underscore or dash in between recognizable terms within the target domain name. For instance, in the example target domain name bankofamerica.com, after processing at the generation unit 140, the resulting attack domain name would be bank_of_America.com or bank-of-America.com. Since the spacing is added between recognizable terms or real words, the medication appears to be natural.

In the character transposition process, two or more characters in a target domain name are transposed, such that the positions of the characters are merely switched or otherwise, moved around between the two or more characters. This kind of modification may be most effective when used with only two letters and preferably towards the middle or end of a domain name.

Character deletion involves deleting one or more characters in a target domain name. The generation unit 140, preferably, selections one or more characters in a target domain name for deletion that usually are not visually noticeable. For instance, in a target domain name, such as betterment.com, with one or more repeating letters, the generation unit 140 may delete one "t" resulting in beterment.com.

Referring back to the pseudo name generation process implemented by the generation unit 140, in some embodiments, the generation unit 140 generates a pseudo domain name by only replacing or modifying a single character in the target domain name. For instance, in the example domain name education.gov, the generation unit 140 may substitute, in a first iteration, the "t" in education.gov with an "l," resulting in pseudo domain name educalion.gov. In another iteration, the generation unit 140 may substitute only the "0" in education.gov with a "0" (a zero), resulting in the homoglyph, education.gov, which is virtually indistinguishable at a first glance from the original domain name. Further, the generation unit 140 in such preferred embodiment may only modify the TLD of a domain name by changing the example domain name education.gov to education.edu. Thus, the original TLD of .gov was changed to .edu. The single character pseudo domain name generation process may be based on the rankings provided in or by the SLD and TLD catalogs, such that the iterations of pseudo domain names first use the most visually similar characters to the original characters of a target domain name as identified in the SLD and TLD catalogs. A benefit of implementing a single character pseudo name generation process at the generation unit 140 is that a single character (or single TLD) substitution is more difficult to recognize as a fictitious domain name at an initial glance than a multiple character substitution or a multiple character and TLD combination substitution. Accordingly, the less that is changed in a pseudo domain name from an original target domain name the higher the similarity characteristics will be between the pseudo domain name and the original target domain name.

It shall be noted that while single character or single TLD substitution may be preferred, it is entirely possible for the generation unit 140 to perform multi-character substitutions or modifications for each iteration of pseudo domain names that the generation unit 140 generates. Thus, in the multi-character substitutions, the generation unit 140 is able to change, at least, two features of an original target domain name including at least two characters of the second-level domain name or at least one character of the second-level domain name and the TLD. The multi-character and TLD modifications and/or substitutions may be beneficial in the instance that all useful single character variations of a target domain name are registered, in use, or somehow restricted from use in a phishing campaign.

As previously mentioned, the generation unit 140 also includes the similarity determination unit (similarity unit) 141 and the pseudo domain name ranking unit (ranking unit) 142. The similarity unit 141 determines a similarity between at least two domain names and after comparing the at least two domain names, determines a fit score. The comparison of domain names at the similarity unit 141 is, preferably, between generated or provided pseudo attack domain name and a target domain name. It shall be noted, however, that the comparison at the similarity unit 141 can be between any distinct domain names including two or more generated or provided pseudo domain names or even, two or more legitimate target domain names. The fit score identified at the similarity unit 141 is provided or otherwise, accessible to the ranking unit 142 for the purposes of ranking the plurality of pseudo domain names generated at the generation unit 140.

The fit score may also be referred to herein as a phishing value where the phishing value indicates a determined probability or likelihood of successfully implementing a phishing attack (e.g., a cyber intrusion attack) on a target computer network, target user, and/or digital resources (e.g., databases, computers, networks, applications, etc.) of the target entity using an identified pseudo domain name. The probability of the phishing value may be indicated generally, as a high, intermediate, or low probability. In one variation, the probability of the phishing value may be indicated as a numerical value or grade value, such as 68% or "C" or the like. In some embodiments, both a general probability and a numerical or grade value may be assigned to a pseudo domain name. It shall be understood that the probability of the phishing value may be communicated or determined in any form factor which indicates a value of a pseudo domain name as it relates to its use in a phishing assessment or phishing attack. The probability of the phishing value may be determined in any manner including using statistical methods based on one or more tests involving the success rate of certain and/or different types of pseudo domain names.

Additionally, or alternatively, whether a generated pseudo domain name is included in a grouping (e.g., list, table, or other data structure) for selection by the system 100 or selection by an administrator of the target entity may depend on whether a calculated for each generated pseudo domain name satisfies or exceeds a predetermined phishing value threshold. The predetermined phishing threshold preferably relates to or defines a minimum likelihood or a minimum probability of successfully implementing a phishing attack against the target entity or the like. Thus, phishing values that satisfy or exceed the predetermined phishing value threshold may be included in a grouping of generated pseudo domain names for further consideration and/or use and the domain names that do not have associated phishing values meeting or exceeding the predetermined phishing value threshold may be discarded or permanently eliminated from consideration (e.g., flagged for cancellation and non-reproduction using system 100).

Additionally, or alternatively, the phishing value threshold may be dynamic rather than static or predetermined such that the phishing value threshold may change based on a number of suitable pseudo domain names available to be used in generated the pseudo domain names. For instance, the target entity name may be so short (e.g., duo.com) that only certain domain name modification operations may be suitable to be applied and thus, only a limited number of pseudo domain names generated. In such case, the system 100 may be configured to automatically identify such a situation and dynamically change the phishing value threshold. In this example situation, the system Dm would adjust the dynamic phishing value threshold downward to encourage inclusion of generated pseudo domain names for duo-.com.

The similarity unit 141, preferably, applies a number of similarity schemes against the pseudo domain names generated by the generation unit 140 to determine similarities between a pseudo domain name and a target domain name. Generally, in one or more of the similarity schemes, the similarity unit 141 identifies the target domain name and selects or is provided one or more pseudo domain names and compares the target domain name to each of the selected or provided pseudo domain names. Additionally, prior to or during the performance of the application of the similarity schemes, the similarity unit 141, identifies a number of characters in the target domain name and a number of characters in the pseudo domain name, a position (e.g., $1^{st}$, $2^{nd}$, $3^{rd}$, etc.) of each of the characters in the target domain name and the pseudo domain name, and the type of character at each position of the target domain name and the pseudo domain name. These identified characteristics of the target domain name and the pseudo domain name are useful characteristics that may be used in each of the similarity schemes.

According to a first similarity scheme applied to a pseudo domain name and target domain name, the similarity unit 141 determines a number of characters in both the target domain name and the pseudo domain name and if the number of characters match between the two, the similarity unit 141 proceeds to a subsequent similarity metric in the first similarity scheme. The number of characters identified in the target domain name is the base value B and the number of characters identified in the pseudo domain name is the non-base value NB. However, if the number of characters between the target domain name and the pseudo domain name does not match, the similarity unit 141 either calculates or measures the difference between the base value B and the non-base value NB for the target domain name and the pseudo domain name.

Using the variables identified above, one version of the similarity scoring or fit scoring algorithm would look like the following:

$$\text{Fit Score} = 100 - \left[\left[1 - \frac{B - [|B - NB|]}{B}\right] * 100\right]$$

As an example, in evaluating the target domain name example.com and the pseudo domain name examples.com, the similarity unit 141 determines that the base value for the target domain name is 11 (e.g., B=11) since there are a total of 11 characters in the SLD and TLD of the target domain. For the pseudo domain name, the similarity unit determined that the non-base value is 12 (e.g., NB=12). Applying these example values in the above fit score algorithm results in the following:

$$\text{Fit score} = 90.91 = 100 - \left[\left[1 - \frac{11 - [|11 - 12|]}{11}\right] * 100\right]$$

Thus, for the example above, the resulting fit score is 90.91. In this example, the values for the fit score are in the range of zero (0) to one hundred (100) and any NB values causing the number of the quotient to be zero or a negative value automatically results in a fit score of zero (0). According to this example, the greater the fit score value, the greater the similarity between the pseudo domain name and the target domain name.

Additionally, and/or alternatively, in evaluating the similarity between a pseudo domain name and a target domain name, the determines whether any character in the pseudo domain name is a homoglyphic replacement for an original character in the target domain name. For instance, when the pseudo domain name is example.com and the target domain name is example.com, the similarity unit 141 would determine that the base value and the non-base values are the same for the two domain names. However, upon comparison of each individual character in each of the two domain names, the similarity unit 141 would determine that the single character "l" in the target domain name with a different character "I". For each substituted character (SB), the similarity unit 141 assigns the SB a value, such as one (1). Additionally, if the similarity unit 141 determines that the substituted character(s) in the pseudo domain name is also a homoglyph of the original character in the target domain name, the similarity unit 141 assigns a value of one to the SB together with a homoglyph multiplier (HM), such as five-tenths (0.5), where the value of HM is between zero and one. It shall be noted that the multiplier can be any dynamic or predetermined value between zero and one and may also depend on whether the homoglyph is in the SLD or the TLD. In some instances, if the homoglyph is in the TLD, the homoglyph multiplier is made smaller, such as 0.25, to account for the homoglyphic character being located later in the pseudo domain name, which allows for a greater similarity between the pseudo domain name and the target domain name.

Using the variables identified above, a second version of the similarity scoring or fit scoring algorithm would look like the following:

$$\text{Fit Score} = 100 - \left[\left[1 - \frac{B - [|B - NB|] - SB*HM}{B}\right]*100\right]$$

Applying the above values in the second fit score algorithm results in the following:

$$\text{Fit Score} = 95.45 = 100 - \left[\left[1 - \frac{11 - [|11 - 11|] - 1*.5}{11}\right]*100\right]$$

Accordingly, the fit score for the single character homoglyphic transformation of the target domain name, example.com, results in a higher fit score of 95.45; meaning that the pseudo domain name exampIe.com has a higher similarity to the target domain name than the pseudo domain name examples.com.

Additionally, and/or alternatively, in evaluating the similarity between a pseudo domain name and a target domain name, the determines whether any characters in the pseudo domain name are transposed. For instance, when the pseudo domain name is examlpe.com and the target domain name is example.com, the similarity unit 141 would determine that the base value and the non-base values are the same for the two domain names. However, upon comparison of each individual character in each of the two domain names, the similarity unit 141 would determine that the two characters "l" and "p" are merely transposed. For each out of position character (P), the similarity unit 141 assigns the P a value, such as one (1). Thus, the P value in this instance would be two (2) since there are two characters which are not in their original positions, as determined by the target domain name. Additionally, if the similarity unit 141 determines that the out of position characters in the pseudo domain name are simply transposed based on the original characters in the target domain name, the similarity unit 141 assigns a transposition multiplier (TM) to the P value, such as five-tenths (0.75), where the value of TM is between zero and one. It shall be noted that the transposition multiplier can be any dynamic or predetermined value between zero and one and may also depend on whether the transposition is in the SLD or the TLD. In some instances, if the transposition is in the TLD, the transposition multiplier is made smaller, such as 0.25, to account for the transposed characters being located later in the pseudo domain name, which allows for a greater similarity between the pseudo domain name and the target domain name.

Using the variables identified above, a second version of the similarity scoring or fit scoring algorithm would look like the following:

$$\text{Fit Score} = 100 - \left[\left[1 - \frac{B - [|B - NB|] - SB*HM - P*TM}{B}\right]*100\right]$$

Applying the above values in the second fit score algorithm results in the following:

$$\text{Fit Score} = 86.36 = 100 - \left[\left[1 - \frac{11 - [|11 - 11|] - 0*0 - 2*.75}{11}\right]*100\right]$$

Accordingly, the fit score for the transposed characters in the pseudo domain name, results in the lowest fit score of 86.36; meaning that the pseudo domain name examlpe.com has a lower similarity to the target domain name than the pseudo domain names examples.com and exampIe.com.

It shall be understood that the above example similarity score or fit score algorithms may be modified to take into account any kind or type of transformation applied to a target domain name to arrive at a pseudo domain name. Thus, the fit score algorithm should not be limited by these examples. For example, the fit score algorithm may be modified to take into account domain name transformations that involve adding pre-fixes and suffices, repositioning and spacing, and/or the like. In such modifications, it would be possible to add one or more variable in the numerator of the quotient portion of any of the above examples of a fit score algorithm to properly capture the changes in similarity introduced by any additional transformation process.

The pseudo domain name ranking unit 142, preferably, analyzes the fit scores for each of the pseudo domain names and ranks each of the pseudo domain names accordingly. The pseudo domain names may be ranked according to a pseudo domain name ranking spectrum and/or pseudo domain name ranking continuum which illustrates a relative similarity position of each of the pseudo domain names along a range of value or the like. The ranking spectrum and/or ranking continuum may be visually illustrated via a display or the like. In this way, if the illustration is presented to an administrator, the administrator is able to easily determine the relative similarity of each of the pseudo domain names and make a selection of a pseudo domain name, accordingly. In the above examples, the higher the fit score, the greater the similarity. Thus, taking into account the three examples above, the ranking unit 142 would rank the pseudo domain names of example.com in the following order:

1. exampIe.com
2. examples.com
3. examlpe.com

In this ranking example by the ranking unit 142, the pseudo domain name at the top which follows 1. would be the most similar to the target domain name example.com and examples.com would be the second most similar to the target domain name. By ranking the pseudo domain names, allows for the administrator or the autonomous system to readily identify and select the most similar target domain names which would allow for a phishing campaign with an increased difficulty.

Additionally, the web crawling unit 150 of system 100 is configured to search the web and/or intranet of an entity to identify one or more web pages and record/copy the one or more features and attributes of the web page. Specifically, upon receipt or based on an identification of a target entity/organization by the identifying unit 110 or otherwise, the web crawling unit 150 identifies the web presence of the target entity in order to identify the one or more web pages, social media pages, intranet pages, and other related pages that are associated with the entity or a target domain name of the entity. Accordingly, the web crawling unit 150 of a preferred embodiment is able to automatically discover many or all of the web pages associated with an identified target entity name. Thus, it is also possible that the web crawling unit 150 uses one or more target domain names of the target entity to identify the web presence of the target entity. Similarly, the web crawling unit is able to identify a web presence of one or more affiliates and/or service providers of the target entity and perform the same functions against the web pages associated with each of the affiliates and/or service providers.

Once the web crawling unit 150 identifies the web presence of the target entity, the web crawling unit 150 evaluates the one or more web pages associated with the target entity and captures the features and/or attributes of the one or more web pages. Thus, the web crawling unit 150 is able to copy all of the content, graphics, illustrations, formatting, code, and other features and attributes of the one or more web pages. Subsequently, the web crawling unit 150 transmits to and/or stores the copied content in a datastore accessible to or otherwise, that is a part of the system 100. In this way, the copied content can be used and/or evaluated by the fictitious web page generation unit 160. Additionally, and/or alternatively, the web crawling unit 150 automatically provides the copied content directly to the fictitious web page generation unit 160 for processing.

The fictitious or pseudo web page generation unit 160 (page generation unit 160) is configured to generate one or more fictitious and/or pseudo web pages, preferably, to be used in a phishing campaign. In particular, the page generation unit 160 is able to access the web page content of the one or more web pages associated with a target entity or target domain name that is stored in the datastore and automatically generate one or more fictitious web pages that mirrors or substantially matches the one or more legitimate web pages of the target entity. In the page generation process, the page generation unit 160 will substitute the original target domain name of the target entity and replace the target domain name with a pseudo domain name that was generated by the pseudo domain name generation unit 140 or otherwise, provided by an administrator of the phishing campaign.

In a variation of the fictitious domain name generation process, the page generation unit 160 is able to use portions of copied content of multiple legitimate web pages of the target entity to generate a new and non-copy fictitious web page to be used in a phishing campaign. Similarly, the page generation unit 160 is able to associate the generated, non-copy fictitious web page with at least one pseudo domain name generated at the pseudo domain name generation unit 140 or otherwise, provided to the page generation unit 160.

An administrator or the like is able to use the user interface and input system 170 to configure, monitor, and manipulate one or more phishing campaigns. A user interface of system 170 includes a display, such as one or displays and/or one or more touch panels, which are, preferably, used to implement and monitor a phishing campaign. The system 170, additionally, and/or alternatively includes one or more additional input and output devices that are used for interacting with the components of the system 100 and preferably, for managing the phishing campaign.

2. Method for Preventing Phishing Activity

Figure 2:
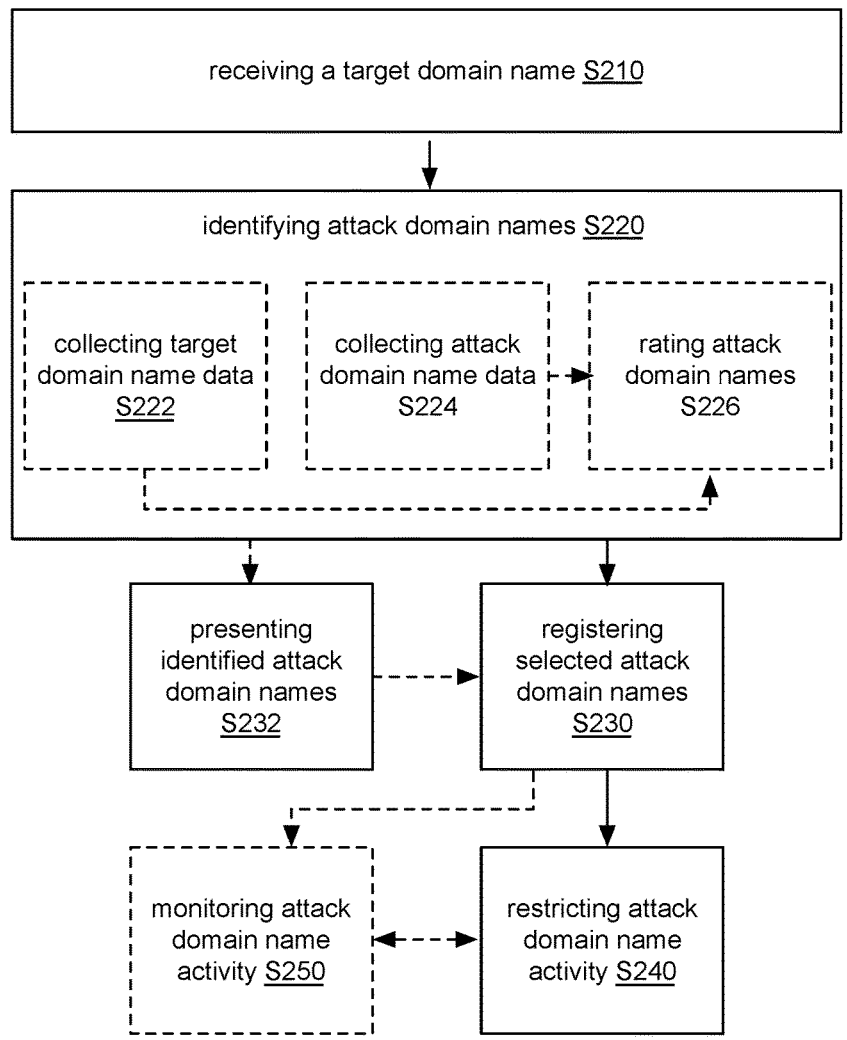
FIG. 2 is a schematic representation of a variation of a method of a preferred embodiment.

As shown in FIG. 2, a method 200 for preventing phishing activity includes receiving target domain name input S210, identifying attack domain names S220, registering selected attack domain names S230, and restricting attack domain name activity S240. The method 100 can additionally or alternatively include monitoring attack domain name activity S250.

As described in the background section, although approaches for addressing phishing activity exist, they frequently lack in either or both of automation level and sophistication. For example, enumeration of possible "lookalike" domain names can be an arduous and imprecise task if completed manually. Further, it may be difficult to rate the probability that a given "lookalike" domain name would be used in a phishing attack. Even if an at-risk "lookalike" domain name is registered by a legitimate entity, phishing attacks based on the "lookalike" domain name can still be orchestrated if the proper preventative measures are not taken to restrict activity from the "lookalike" domain name.

The method 200 functions to reduce phishing activity by identifying at-risk "lookalike" domain names and restricting illegitimate activity from the "lookalike" domain names; the method 200 may further provide powerful tracking and/or analytical tools to enable companies and organizations to not only assess, but also reduce phishing risks.

The method 200 is preferably enabled by a web-based software platform operable on a web server or distributed computing system. Additionally or alternatively, the method 200 and/or portions of the method 200 may be performed by any suitable computer system capable of identifying attack domain names and restricting activity stemming from the attack domain names.

2.1 Receiving a Target Domain Name.

Figure 3:
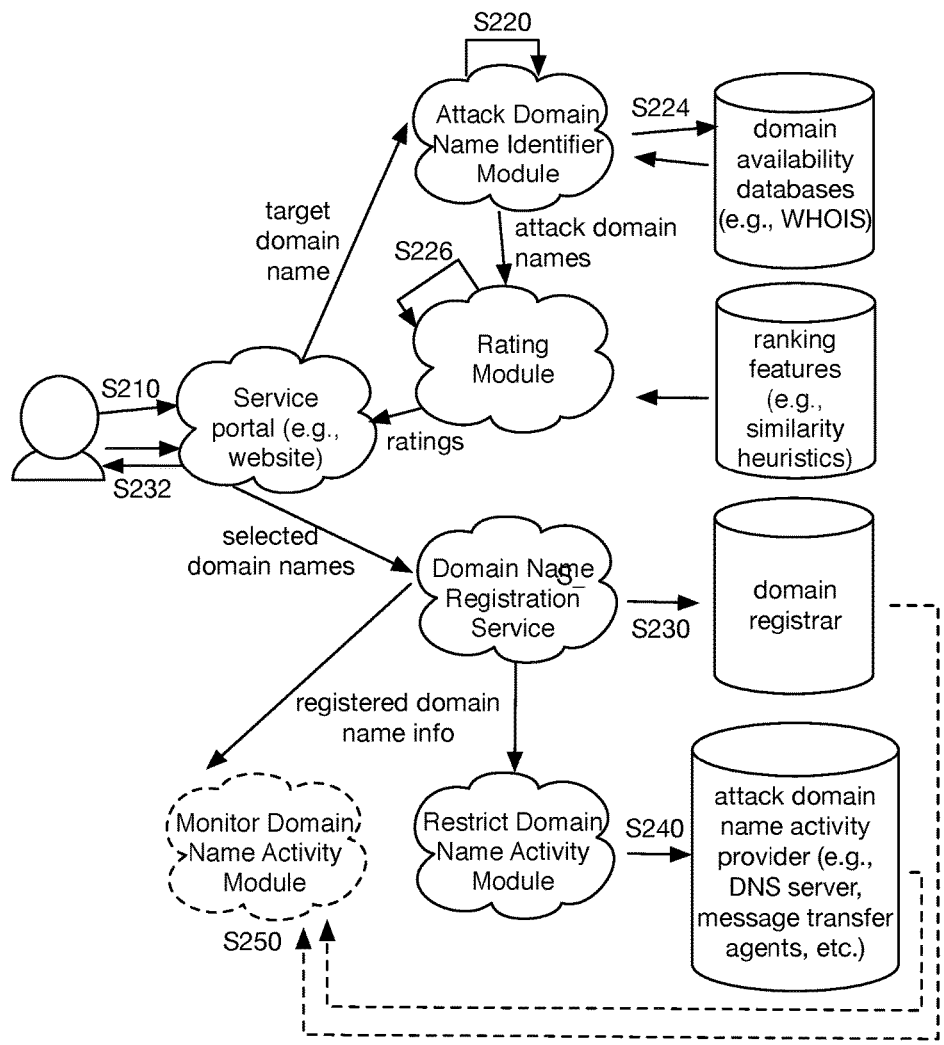
FIG. 3 is a schematic representation of a variation of a method of a preferred embodiment.
Figure 4:
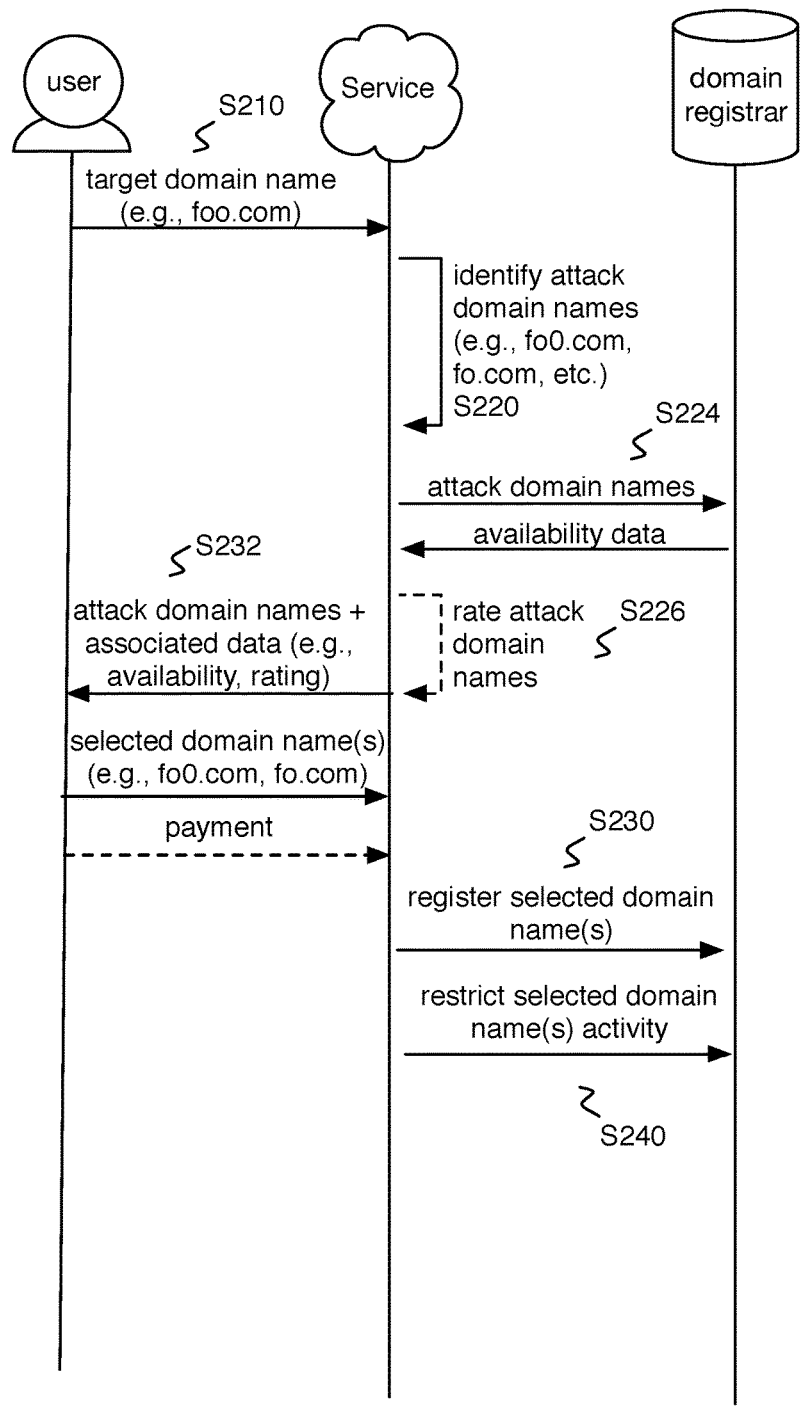
FIG. 4 is a schematic representation of a variation of a method of a preferred embodiment.

As shown in FIGS. 2-4, S210 includes receiving a target domain name. S210 functions to collect a target domain name upon which attack domain name variants can be identified, registered, and/or restricted campaign authorization.

A target domain name is preferably a domain name for which a user seeks protection against phishing attacks. Additionally or alternatively, a target domain name can be a domain name for which a user seeks attack-related data or a domain name used for any other purpose. A target domain name is preferably received from a user. A user can be an administrator (e.g., domain name manager, manager of a network), an individual with access to the network or a computer network associated with the target domain name, an individual associated with the organization owning the target domain name, and/or any suitable entity related to the target domain name. Alternatively, a target domain name can be received by any suitable entity.

In S210, a target domain name is preferably received. Additionally or alternatively, S210 can include receiving associated target domain name data (e.g., IP address, DNS information, associated domain registrar, etc.), entity name, names associated with the entity (e.g., names of products of the organization, names of employees, etc.), and/or any other suitable information for providing the basis for identifying attack domain names (e.g., in S220). However, S210 can include receiving any suitable information.

A target domain name and/or other suitable information can be received through a website (e.g., a web portal, website form, etc.), an application, an API, e-mail, and/or through any suitable communication means. In a variation, S210 can include identifying potential target domain names associated with an entity. In this variation, a user can be informed of relevant domains that could be a potential phishing target. For example, S210 can include identifying domain names owned by an entity, presenting target domain name options representing the identified domain names, and receiving one or more target domain name selections from the target domain name options. Identified potential target domain names can be ranked (e.g., in a similar fashion as S226) based on probability of being a target for phishing. For example, the domains "coca-cola.com" and "cokepromotions.com" might both be associated with Coca-Cola; however, it may be substantially more likely that a phishing campaign targeting Coca-Cola (as opposed to Coke consumers) may use the corporate domain name than one associated with promotions.

However, S210 may additionally or alternatively include receiving a target domain name in any manner.

2.2 Identifying Attack Domain Names.

As shown in FIGS. 2-4, S220 includes identifying attack domain names. S220 functions to generate domain names that are potentially at-risk of being used in a phishing attack. As shown in FIG. 2, S220 can additionally or alternatively include collecting target domain name data S122, collecting attack domain name data S224, and/or rating attack domain names S226.

Attack domain names are preferably at-risk domain names which may be used to perform a phishing attack. Additionally or alternatively, attack domain names can be domain names upon which attack-related activity data can be collected and/or monitored (e.g., in S250).

S220 preferably includes identifying attack domain names from one or more target domain names (e.g., received in S210). Additionally or alternatively, identification of attack domain names can be based on other user-received data (e.g., received in S210), collected target domain name data (e.g., in S122), phishing attack data (e.g., data regarding attempted phishing attacks related to the organization, phishing attack behavior, attacker data), domain status of the entity (e.g., domain names owned by the entity, corresponding activity data, etc.), user preferences, and/or any other suitable criteria. User preferences can include preferred techniques for identifying domains similar to the target domain name, number of attack domain names to identify, types of attack domain names to identify (e.g., types of top-level domains, lower level domains, syntax, geographic origin, etc.), and/or any other suitable user preferences.

Identifying attack domain names S220 preferably includes performing operations that modify the target domain name by any combination of: homoglyphs (e.g., replacing one or more characters with a visually similar character), repetition (e.g., repeating one or more characters), bitsquatting (e.g., modifying the bit representation of a domain name by one or more bits), omission (e.g., deleting one or more character), insertion (e.g., inserting one or more character), replacement (e.g., replacing one or more target characters with one or more characters in close proximity to the target characters on a traditional QWERTY keyboard), transposition (e.g., swapping character position), singularization (e.g., converting a domain name into singular form), pluralization (e.g., converting a domain name into plural form), top-level domain switching (e.g., .com to .org), punctuation modification (e.g., adding an additional dash to the target domain name), appending (e.g., appending a related concept to the target domain name, such as a product name associated with the entity owning the target domain name), and/or any other suitable operation.

In a variation, identifying attack domain names S220 can be performed according to attack domain name generation parameters. Such parameters can include: amount (e.g., number of attack domain names to generate), types of modification operations (e.g., homoglyph operations, repetition operations, etc.) to perform, iteration parameters (e.g., performing modification operations on generated attack domain names), data types used (e.g., attack domain name generation based only on target domain name, based on phishing attack data, etc.), and/or any suitable parameters. In an example, S220 can include applying target domain name modification operations based on statistically common domain name variation types used by attackers. In a specific example, if insertion operations are frequently applied to target domain names by attackers, a larger proportion of identified attack domain names can be spawned by applying insertion operations. However, identifying attack domain names S220 based on attack domain name generation parameters can be performed in any suitable fashion.

In another variation, an attack domain name can be suggested by a user and/or other suitable entity. For example, S220 can include receiving, at a web interface, one or more attack domain names from a user. Received attack domain names can be grouped with generated attack domain names when performing any suitable portion of the method 200 with the attack domain names.

S220 may alternatively include identifying attack domain names in any manner.

2.2.A Collecting Target Domain Name Data.

As shown in FIG. 2, S220 can optionally include S122, which includes collecting target domain name data. S122 functions to collect data about an entity associated with the target domain, where the data can be used in generating attack domain names (e.g., in S220) and/or rating generated attack domain names (e.g., in S226). For example, S122 can collect information regarding prominent individuals (e.g., a CEO, a celebrity, etc.) associated with the target domain name, and the information (e.g., a name of the prominent individual) can be appended to the target domain name to generate attack domain names. In a variation, target domain name data can be leveraged in generating additional target domain names (e.g., already owned and/or registered domain names). For example, information regarding a target domain name's associated domain registrar can be collected, and the domain registrar can be queried for additional domain names owned by the entity to which the target domain name belongs. In another example, S122 can include collecting subsidiary and/or parent company information for an organization associated with the target domain name, where domain names registered by the subsidiaries and/or parent companies can be used as additional target domain names.

Target domain name data can include data regarding one or more of: an associated target domain name data (e.g., ownership period, DNS information, associated domain registrar, individuals with administrator access to the domain name, etc.), an organization's web presence (e.g., website, publicly available data, social media presence, etc.), individuals associated with the organization (e.g., roles, names, permission levels, etc.), and/or any other suitable data.

Target domain name data can be collected through web scraping, database queries, user submission, and/or through any suitable mechanism. S122 may alternatively include collecting target domain name data in any manner.

2.2.B Collecting Attack Domain Name Data.

As shown in FIGS. 2-4, S220 can optionally include S224, which includes collecting data related to the attack domain name. S224 functions to collect data related to the attack domain name, to be used in identifying attack domain names and/or generating an analysis of identified attack domain names.

Attack domain name data preferably includes determining whether an attack domain name is available to purchase and/or register. For example, S224 can include querying a WHOIS server (e.g., performing a WHOIS lookup) with the attack domain name and/or related key works to determine availability of an attack domain name and/or related domain names. However, any suitable databases can be queried to determine attack domain name data. Attack domain name data can additionally or alternatively include: DNS resource records (e.g., AAAA, CNAME, A, MX, HINFO, ISDN, MX, NS, PTR, SOA, TXT, etc.), IP address, geographic origin, ownership data (e.g., owner, time of registration, update information, expiration date, etc., associated domain name registrar, etc.), price data, popularity metrics, rankings, content data (e.g., type of published content, etc.), and/or any other suitable attack domain name data.

Collected attack domain name data can be presented to user (e.g., in S232), used in rating domain names (e.g., in S226), iteratively used in identifying attack domain names (e.g., in S220; data collected for a generated attack domain name data can be used in generating another attack domain name, etc.), and/or for any suitable purpose.

In a variation, S224 can include monitoring the registration status of one or more attack domain names. Monitoring registration status preferably includes accessing zone files for registries of top level domains (e.g., .com, .net, .org, etc.). For example, S224 can include accessing registry zone files through the Centralized Zone Data Service (CZDS). Accessed zone files can be parsed for registration status of one or more attack domain names. Additionally or alternatively, S224 can include monitoring attack domain name registration status through performing a series of WHOIS lookups for the attack domain names, but registration status can be monitored in any manner. Attack domain name registration status can be monitored and/or presented to a user at specified time intervals (e.g., every hour, every day, every week, etc.), in response to a user request, in response to registry zone file updates, and/or at any suitable time. In an example, identified attack domain names (e.g. in S220) can be presented to a user along with options for the user to select attack domain names to be monitored. In another example, S224 can include monitoring registration status for all enumerated attack domain names, but the registration status of any attack domain name can be monitored in any manner.

However, S224 can additionally or alternatively include collecting attack domain name data in any manner.

2.2.C Rating Attack Domain Names.

As shown in FIGS. 2-4, S220 can optionally include S226, which includes rating attack domain names. S226 rate and/or rank identified attack domain names (e.g., identified in S220) in order to guide the selection of attack domain names for which to restrict activity.

S226 preferably includes generating a metric that indicates how likely (e.g., a probability, likelihood indication, etc.) the attack domain name would be used in a phishing attack. Additionally or alternatively, S220 can include generating metrics indicating the likelihood a user would succumb to a phishing attack using the attack domain name. However, attack domain names can be rated and/or ranked based on: target domain name data (e.g., collected in S122), attack domain name data (e.g., collected in S224), user preferences, and/or any suitable criteria.

In a first variation, S226 can include determining a visual similarity score indicating a degree of visual similarity between the attack domain name and the target domain name.

In a second variation, S226 can include determining a popularity metric evaluating the popularity (e.g., to the general public, to a potential attacker, etc.) of an attack domain name. A popularity metric can be based on search engine results for the attack domain name (e.g., number of results, relevancy of results, etc.), social media results for the attack domain name (e.g., number of mentions, profiles of who is mentioning the attack domain name, etc.), and/or any other suitable criteria.

In a third variation, S226 can include determining a "fit" score representing a degree to which the target domain name fits the image and/or brand of an organization. A "fit" score can be based on the attack domain name's relevancy to the organization (e.g., an attack domain name including a product name of the organization in the attack domain name, an attack domain name including a tagline of an organization, etc.), and/or other suitable criteria.

In a fourth variation, S226 can include rating a set of attack domain names using a model generated based on features extracted from types of differences between a target domain name and attack domain name. The model can be trained on data including known attack domain names that have been used in phishing attacks, statistically common techniques used by attackers, and/or other relevant data.

In a fifth variation, S226 can include rating a set of attack domain names using a model generated based on statistical probabilities of user error in entering a domain name (e.g., into a web browser address bar). Types of user error can include: common misspellings, pressing a wrong key on a keyboard, top-level domain errors, and/or any suitable user error.

However, S226 can additionally or alternatively include rating attack domain names in any manner.

2.3 Registering Selected Attack Domain Names (Implementing Security Protocols).

Once the attack domain names are identified, as in S210-S220, the method 200 may implement one or more digital or computer security protocols to mitigate the probability and/or opportunity for cyber intrusions or phishing attacks using the generated attack domains. S230-S250 provide examples of some of the salient security measures that may be performed automatically by the system implementing method 200 (e.g., system 100).

Implementing the one or more security protocols for mitigating cyber intrusions using the attack domain names may include performing a digital lockdown of the attack domain names. A digital lockdown may include restricting digital access and use of the plurality of phishing attack domain names by entities other than the target entity or including the target entity. The digital lockdown of the attack domain names may ensure that malicious attackers using the Internet or other cyber means cannot gain control, access, or use of the attack domain names for malicious purposes (e.g., attacking digital or computer resources). A digital lockdown may be a multi-step and/or multi-faceted process that seeks to obtain registration of the attack domain names prior to an attacker, monitoring any Internet or web activity associated with the attack domain names, provide alerts to the unauthorized use of the attack domain names, set specific computer network filters that do now allow passing of any of the attack domain names, and the like.

As shown in FIGS. 2-4, S230 includes registering selected attack domain names. S230 functions to facilitate registration of selected attack domain names identified in S220. S230 can additionally or alternatively include presenting identified attack domain names S232.

Selected attack domain names preferably include one or more identified attack domain names (e.g., in S220) that are selected by the user for registration. Additionally or alternatively, selected attack domain names can include automatically selected attack domain names (e.g., without a direct selection by the user). Automatically selecting attack domain names is preferably based on domain registration user preferences (e.g., preferred domain name registrars, price thresholds, privacy preferences, features, rating thresholds, number of attack domain names to select, etc.) and/or any other suitable criteria. In a specific example, S230 can include receiving a domain registration user preference specifying automatic selection of the top three rated (e.g., in S226) attack domain names. However, attack domain names can be selected in any suitable fashion.

In a first variation, S230 includes automatically registering selected attack domain names (e.g., without requiring action by the user). Automatic registration can be substantially or fully machine-performed, such as by communicating with a domain registrar through an API. Additionally or alternatively, automatic registration can include a non-user individual performing one or more portions of the registration process. However, automatically registering selected attack domain names can be performed in any suitable manner.

In a second variation, S230 can include guiding a user through a registration process. For example, a virtual assistant (e.g., a chat bot, etc.) can aid a user with issues during the registration process. In another example, S230 can include opening a domain registrar with pre-populated forms.

However, S230 can additionally or alternatively include registering selected attack domain names in any fashion, and/or can be otherwise omitted (e.g. presenting identified attack domain names to a user (S232) and allowing the user to manually register one or more attack domain names).

2.3.A Presenting Identified Attack Domain Names.

As shown in FIGS. 2 and 4, S230 can optionally include S232, which includes presenting identified attack domain names. S232 functions to present attack domain names and/or associated information to a user (e.g., at a user device, web portal, application, etc.) and/or other suitable entity.

S230 preferably includes presenting one or more identified attack domain names with associated ratings and/or rankings (e.g., determined in S226), but attack domain names can be alternatively presented without a rating and/or ranking. As shown in FIG. 5, attack domain names can additionally or alternatively be presented along with associated attack domain name data (e.g., collected in S224), options (e.g., to select an attack domain name, to purchase, to register, to obtain additional information regarding registration, etc.), target domain name data, information for domains associated with the user (e.g., already-owned domains, associated data such as expiry date for domain registration, similarity of already-owned domain names to identified attack domain names, etc.), and/or any suitable information. Presented information can be filtered (e.g., by a user) based on price parameters (e.g., thresholds, ranges), domain registrar, privacy preferences, features, and/or other suitable parameters.

S232 can additionally or alternatively include presenting identified attack domain names in any manner.

2.4 Restricting Attack Domain Name Activity

As shown in FIGS. 2-4, S240 includes restricting attack domain name activity. S240 functions to prohibit activity that stems from the attack domain name.

Attack domain name activity preferably includes e-mail activity from the attack domain name. Restricting e-mail activity preferably includes creating one or more e-mail validation policies. Created e-mail validation policies preferably instruct one or more e-mail providers (e.g. message transfer agent, mail submission agent, maul user agent, etc.) to restrict (e.g., reject, quarantine, etc.) e-mail originating from the attack domain name, but the established e-mail validation policies can specify any suitable actions to be performed in relation to the e-mail activity. E-mail validation policies can be setup for one or more of: Sender Policy Framework (SPF), DomainKeys Identified Mail (DKIM), sender ID, Domain-based Message Authentication Reporting and Conformance (DMARC), and/or any other suitable framework. For example, an SPF record can be added to a DNS zone file for the attack domain name, where the SPF record restricts the authorized senders for the domain. In another example, a DMARC policy can be created that rejects an e-mail from the attack domain name in all situations, whether or not a SPF and/or DKIM check fails or succeeds. Alternatively, in another example, a DMARC policy can be created that instructs an e-mail provider to reject an e-mail from the attack domain name if a SPF and/or DKIM check fails, but not if a SPF and/or DKIM check succeeds. Additionally or alternatively, restricting e-mail activity can include directly notifying message transfer agents to disregard e-mails associated with the attack domain name. However, restricting e-mail activity can be performed in any suitable manner.

Attack domain name activity can additionally or alternatively include: policy modification activity (e.g., modifying an e-mail validation policy), DNS activity (e.g., DNS record modification, DNS lookups, etc.), website activity (e.g., published content, redirection, visitor access, etc.), web browser activity (e.g., browser domain name block lists, etc.), web application activity (e.g., website builders, retail management platforms, etc.), database activity, and/or any other suitable activity that can be restricted. For example, S240 can include updating a Security Certificate (e.g., SSL certificate) for the registered attack domain name. An application can be automatically transmitted to a certificate provider for obtaining a certificate (e.g., Domain Validated certificate, Organization Validated certificate, Extended Validation certificate) to be served to web browsers connecting to a website with the domain name. Alternatively, a certificate provider can be instructed to reject any requests for certificates for the registered attack domain name.

In a first variation, S240 can include distributing registered attack domain name information to an entity capable of restricting attack domain name activity. For example, attack domain name information can be reported to a security software provider (e.g., antivirus software provider, antiphishing software provider), who can then restrict activity from the attack domain name for users of the security software. In another example, attack domain name information can be transmitted to software providers who are distributing a domain-integrating service, such as a website builders or a retail management platforms. The domain-integrating services can be instructed to reject requests for integration with the registered attack domain names. In another example, registered attack domain names can be reported as potential phishing targets to web browsers, search engines, and/or other entities associated with website activity. However, registered attack domain name information can be alternatively distributed in any manner.

In a second variation, S240 can include modifying software configuration settings (e.g., on a user device, or at a service). Alternatively, S240 may include transmitting requests and/or suggestions for modifications. Software configuration settings can include one or more of: messaging client (e.g., e-mail client, text messaging client, phone calling client, etc.) configuration settings (e.g., blocked sender list, actions to take regarding suspicious messages, reporting settings, alert settings etc.), web browser configuration settings (e.g., blocked domain names, reporting settings, etc.), and/or other suitable configuration settings. Modifying software configuration settings on a user device, for example, provide benefits in situations where a legitimately owned domain name is compromised, or when an attack domain name is already registered under a suspicious entity. In an example, S240 can include modifying an e-mail client's blocked sender list to include the registered attack domain names. In another example, S240 can include modifying a user's security software (e.g., antiviral, antiphishing, etc.) settings to warn a user regarding any activity originating from the attack domain names. Modifying software configuration settings on a user device can be automatic (e.g., without action by a user), guided (e.g., educating a user on how to modify the configuration settings), and/or substantially manual (e.g., informing the user that the configuration settings should be modified). Software configuration settings can be alternatively modified in any manner.

In a third variation, S240 can include using the attack domain name in a phishing campaign designed to identify individuals susceptible to phishing attacks and/or phishing attack types that are likely to succeed. S240 can additionally or alternatively include using the attack domain name in a phishing campaign as described in U.S. Provisional Application No. 62/248,031, filed 29 Oct. 2015, which is incorporated in its entirety by this reference.

In a fourth variation, restricting attack domain name activity S240 can include providing a warning to (or otherwise notifying) a potential phishing attack target (e.g., an individual who uses a service provided by the entity associated with the target domain). Warnings preferably caution a phishing attack target from participating in activity (e.g., clicking links, reading e-mails) associated with the attack domain name activity. Warnings can include verbal, audio, graphical content and/or content of any suitable form. For example, providing a warning can include publishing a warning message on a website associated with the attack domain name. In another example, providing a warning can include e-mailing potential phishing attack human targets regarding one or more attack domain names. However, providing a warning can be performed in any suitable manner.

Attack domain name activity is preferably restricted for attack domain names registered in S230. Alternatively, S240 can be performed for identified attack domain names that are unregistered and/or registered with an illegitimate owner (e.g., sending a warning message regarding such attack domain names). However, S240 can be performed for any suitable domain name, including the target domain name and/or another user-owned domain name.

Restricting attack domain name activity S240 is preferably fully or partially automatically performed (e.g., without requiring action from the user). For example, S240 can automatically include creating a DNS record for a DNS server. S240 can include restricting attack domain activity in a default manner (e.g., restricting e-mail activity through an established set of SPF and DMARC policies for every attack domain name that S240 is performed on, etc.). Additionally or alternatively, automatically restricting attack domain activity can be based on activity restriction user preferences. Activity restriction user preferences can include one or more of: types of attack domain activity to prohibit (e.g., e-mail activity), manners in which an attack domain activity type is prohibited (e.g., whether to reject or quarantine e-mails stemming from an attack domain name), monitoring preferences (e.g., types of attack domain activity to monitor in S250), options to select the attack domain names to perform restriction upon, alert preferences, and/or any other suitable preferences related to attack domain name activity. Activity restriction user preferences can be modified at any suitable time through any suitable mechanism (e.g., at a web portal, application, etc.).

S240 can additionally or alternatively include guiding a user through restricting attack domain name activity. For example, S240 may include providing educational material to a user regarding the types of DMARC policies that can be created for the attack domain name, and/or guiding users through creation of a particular DMARC policy. However, S240 can be partially or fully performed by any suitable entities.

S240 can be performed in response to and/or after registering an attack domain name (e.g., in S230), receiving one or more activity restriction user preferences, and/or at any suitable time. However, S240 can additionally or alternatively include restricting attack domain name activity in any manner.

2.5 Monitoring Attack Domain Name Activity.

As shown in FIGS. 2-3, S250 includes monitoring attack domain name activity. S250 functions to collect attack domain name activity data associated with an attack domain name.

S250 preferably includes monitoring e-mail activity associated with the attack domain name. Monitoring e-mail activity can include monitoring one or more of: authentication results (e.g., DKIM authentication results, SPF authentication results, etc.), domain alignment, potential e-mail threats, e-mail data (e.g., content, sender information, metadata, attachments, etc.), trends (e.g., in types of e-mails, types of senders, etc.) for attempted emails from the attack domain name, and/or any other suitable e-mail activity. For example, S250 can include setting DMARC policies or retrieving DMARC reports (e.g., aggregate reports, forensic reports) on e-mail activity. However, any suitable e-mail activity can be monitored.

In a first variation, S250 can include monitoring DNS activity, including DNS lookup information (e.g., identities of entities performing DNS lookups on the attack domain name, number of DNS lookups, timestamps), DNS record activity (e.g., attempted modifications of DNS records, queries, etc.), and/or any other suitable DNS activity. However, monitoring DNS activity can be otherwise performed.

In a second variation, S250 can include monitoring website activity associated with the attack domain name. Website activity can include: traffic information (e.g., number of visits, locations of visitors, visitor identifiers, types of visitors, visit timestamps, etc.), click analytics, and/or any other suitable web analytic information. However, monitoring website activity can be otherwise performed.

In a third variation, S250 can include collecting popularity data associated with the attack domain name. Popularity data can include: social media information (e.g., social media mentions), website activity, search engine results (e.g., number of hits), and/or any other suitable data. In an example, monitored popularity data can be used (e.g., by the organization associated with the target domain name) for market research purposes. In a specific example, popularity data regarding an attack domain name (e.g., a domain name that includes a product name or feature name appended to the target domain name) can be used as an indicator of market interest in a particular product or feature. Additionally or alternatively, collecting popularity data can be performed in any suitable fashion.

However, any suitable attack domain name activity can be monitored.

S250 preferably includes presenting the monitored attack domain name activity to the user and/or other suitable entity. Monitored attack domain name activity information can be presented in a verbal, numerical, graphical, audio, and/or any suitable form. However, presenting the monitored attack domain name activity can be performed in any suitable fashion.

In a variation, monitored attack domain name activity can be used in identifying subsequent attack domain names in S220. For example, DNS activity can be compared between monitored attack domain names in order to guide subsequent generation of attack domain names. In a specific example, S250 can include tracking DNS lookups for a first and a second attack domain name, identifying a target domain name modification operation used in generating the attack domain name with the greater number of DNS lookups, and applying the modification operation more frequently in identifying attack domain names. However, using monitored attack domain name activity data for performing S220 can be completed in any suitable fashion.

In another variation, monitored attack domain name activity can be utilized in updating parameters used in rating attack domain names (e.g., in S226). For example, monitored e-mail activity regarding a spoof e-mail's sender information can be recorded. Such information can be used in generating a known attacker list to be used in rating the likelihood that a given attack domain name would be used in a phishing attack. In a specific example, an attack domain name can be ranked higher if the domain has had DNS lookups from an IP address matching an IP address in the known attack list. Additionally or alternatively, monitored attack domain name activity can be used in any suitable manner for S226.

However, monitored attack domain name activity data can be used in any suitable portion of the method 200, and S250 can additionally or alternatively include monitoring attack domain name activity in any manner.

The method of the preferred embodiment and variations thereof can be embodied and/or implemented at least in part as a machine configured to receive a computer-readable medium storing computer-readable instructions. The instructions are preferably executed by computer-executable components preferably integrated with a system for preventing phishing activity. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for mitigating attacks on a computer network, the system comprising:
a web interface configured to receive target domain name input;
a remote computing server that is configured to generate phishing domain names and that comprises one or more computer processors and a memory storing computer-executable instructions that when executed by the one or more computer processors perform the steps of:
receiving the target domain input, wherein the target domain input comprises a domain name associated with a target entity or target entity data that is useable to generate a plurality of phishing attack domain names;
using the target domain name input to create a plurality of phishing attack domain names, wherein creating the plurality of phishing attack domain names includes:
identifying a plurality of domain name transformation operations that operate to transform the domain name associated with the target entity to one or more attack domain names;
selecting one or more of the identified domain name transformation operations based on features of the domain name; and
applying the selected domain name transformation operations to the domain name;
generating a phishing value for each of the plurality of phishing attack domain names, wherein generating the phishing value includes calculating a likelihood a user would succumb to a phishing attack using a respective phishing attack domain name of the plurality of phishing attack domain names;
setting a phishing value threshold indicating a minimum likelihood of implementing the phishing attack with a created phishing attack domain name;
dynamically changing the phishing value threshold based on a number of phishing attack domain names created;
calculating a visual similarity score for each of the plurality of phishing attack domain names, wherein the visual similarity score indicates a level of resemblance between the target domain name and a phishing attack domain name of the plurality of phishing attack domain names;
selecting a subset of the plurality of phishing attack domain names based on the phishing value threshold and the visual similarity;
implementing one or more computer security protocols that mitigate the likelihood or the probability that the plurality of phishing attack domain names are used in the phishing campaign against the computer network, wherein implementing the one or more computer security protocols includes:
generating one or more e-mail validation policies that restrict e-mail activity from the subset of the plurality of phishing attack domain names to one or more networked devices of the computer network;
updating a security certificate for each of the phishing attack domain names in the subset; and
managing access to each of the phishing attack domain names based on the security certificate.

2. The system of claim 1, wherein the remote computing server is further configured to generate the visual similarity scores for the plurality of phishing attack domain names, wherein generating the visual similarity scores includes:
comparing each of the plurality of phishing attack domain names to the domain name of the target entity;
using the visual similarity to rank the plurality of phishing attack domain names with respect to each other;
wherein the remote computing server further implements the one or more computer security protocols by (i) automatically selecting a portion of the plurality of phishing attack domain names based on the visual similarity scores and (ii) restricting a capability of a malicious actor to use the portion of the plurality of phishing attack domain names in the phishing campaign against the computer network.

3. The system of claim 1, wherein the remote computing server is further:
 ranks each of the plurality of phishing attack domain names based on calculated fit scores, wherein the fit scores indicate a probability or a likelihood of successfully implementing a phishing attack on the target computer network using one of the plurality of phishing attach domain names;
 automatically selects at least a phishing attack domain name of the plurality of phishing attack domain names having a highest rank in the hierarchical order; and
 implements one or more computer security protocols based on the selection.

4. The system of claim 3, wherein implementing the one or more computer security protocols includes implementing a digital lockdown of the plurality of phishing attack domain names, wherein the digital lockdown includes restricting digital access and use of the plurality of phishing attack domain names by entities other than the target entity.

5. The system of claim 1, further comprising:
 a pseudo domain name database, the pseudo domain name database includes characters, each of the characters being electronically associated with a visually similar character or visually similar characters useable in a phishing attack domain name generation process, wherein the web server is in operable communication with the pseudo domain name database.

6. The system according to claim 1, wherein
 a selected domain name transformation operation comprises a homoglyphic domain transformation operation that modifies a second-level domain name portion of the domain name associated with the target entity.

7. The system according to claim 1, wherein
 implementing the one or more security protocols includes registering each of the phishing attack domain names in the subset.

8. A method for preventing a cyber intrusion of digital resources of a target entity, the method comprising:
 at a web computing server:
  receiving target domain input, wherein the target domain input comprises a domain name associated with a target entity or target entity data that is useable to create a plurality of phishing attack domain names;
  using the target domain name input to create the plurality of phishing attack domain names, wherein creating the plurality of phishing attack domain names includes:
   identifying a plurality of domain name transformation operations that operate to transform the domain name associated with the target entity to one or more attack domain names;
   selecting one or more of the identified domain name transformation operations based on features of the domain name; and
   applying the selected domain name transformation operations to the domain name;
  generating a phishing value for each of the plurality of phishing attack domain names, wherein generating the phishing value includes calculating a likelihood a user would succumb to a phishing attack using a respective phishing attack domain name of the plurality of phishing attack domain names;
  setting a phishing value threshold indicating a minimum likelihood of implementing the phishing attack with a created phishing attack domain name;
  dynamically changing the phishing value threshold based on a number of phishing attack domain names created;
  calculating a visual similarity score for each of the plurality of phishing attack domain names, wherein the visual similarity score indicates a level of resemblance between the target domain name and a phishing attack domain name of the plurality of phishing attack domain names;
  selecting a subset of the plurality of phishing attack domain names based on the phishing value threshold and the visual similarity;
  implementing one or more digital resources security protocols that mitigates the likelihood or the probability that selected domain names of the plurality of phishing attack domain names may be used in the phishing campaign against the digital resources, wherein implementing the one or more computer security protocols includes: generating one or more e-mail validation policies that restrict e-mail activity from the subset of the plurality of phishing attack domain names to one or more networked devices of the computer network;
   updating a security certificate for each of the phishing attack domain names in the subset; and
   managing access to each of the phishing attack domain names based on the security certificate.

9. The method of claim 8, wherein the predetermined phishing value threshold defines a minimum likelihood or a minimum probability of successfully implementing a phishing attack on one or more digital resources.

10. The method of claim 9, wherein any of the plurality of phishing attack domain names having the likelihood or the probability of successfully being used in the phishing campaign that satisfies or exceeds the predetermined phishing value is automatically populated to a list or a table of phishing domain name candidates, and
 wherein any of the plurality of phishing attack domain names having the likelihood or the probability of successfully being used in the phishing campaign that does not satisfy or exceed the predetermined phishing value is not included in the list or the table of phishing domain name candidates.

11. The method of claim 8, at the web server further comprising:
 identifying phishing attack domain name generation parameters, wherein the phishing attack domain name parameters include one or more of an amount of attack domain names to be generated, a selection of one or more types of domain name modification operations to be performed in the generating the phishing attack domain names, a number of iterations of generated attack domain names, and an identification of one or more phishing attack domain name generation input data sources.

12. The method of claim 11, at the web server further comprising:
 applying the one or more types of domain name modification operations that are statistically common domain name variation types used by cyber attackers.

13. The method of claim 8, wherein further at the web computing server:

using the target domain name input to identify additional target entity data relating to the target entity; and in response to identifying the additional target entity data, collecting the additional target entity data to be used as input in generating the plurality of phishing attack domain names.

14. The method of claim 8, wherein implementing the one or more digital resources security protocols includes implementing a digital lockdown of the plurality of phishing attack domain names, wherein the digital lockdown includes restricting digital access and use of the plurality of phishing attack domain names by entities other than the target entity.

15. The method of claim 8, further comprises configuring the web computing server to:

rank each of the plurality of phishing attack domain names based the phishing value of the respective phishing attack domain name;

automatically select one or more of the plurality of phishing attack domain names; and wherein implementing the one or more digital resources security protocols is implemented for the selected one or more of the plurality of phishing attack domain names.

16. The method of claim 8, further comprising configuring the sever to perform modification operations to the target domain name by one or a combination of homoglyphic modification, bitsquatting modification, omission modification, replacement modification, transposition modification, singularizing, pluralization, punctuation modification, and appending modification.

17. The method of claim 8, wherein the plurality of phishing attack domain names are look-alike domain names with respect to the target domain name, such that when the plurality of phishing attack domain names are compared to the target domain name, there are visual similarities between each of the plurality of phishing attack domain names and the target domain name.

18. The method of claim 15, wherein the plurality of phishing attack domain names are generated according to a selection of one or of a combination of domain name transformation processes including a homoglyph transformation process, a TLD alternation/modification process, generic or service-specific prefix/suffix augmentation process, character repositioning and spacing, character transposition process, and character deletion process.

19. The system according to claim 17, wherein:

(i) the web server is in operable communication with the pseudo domain name database, (ii) the web server also functions as a target domain name analysis unit that analyzes one or more features and attributes of the identified the target domain name to identify each of the characters in at least a second-level domain name portion and a top-level domain name portion of each of the target domain name, (iii) when the web server function as a phishing attack domain name generation unit, the web server identifies one or more characters in the pseudo domain name database to substitute in a place of one or more characters in at least one of the target domain name based on the analysis at the target domain name analysis unit, and (iv) the web server functioning as the phishing attack domain name generation unit generates at least one of the plurality of phishing attack domain names by substituting one or more characters from the pseudo domain name database into the target domain name.

20. The system of claim 18, wherein the target domain name analysis unit also compares each character in the second-level domain name portion of the at least one of the target domain name to the characters in the pseudo domain name database to determine whether any of the characters in the second-level domain name portion has a corresponding visually similar character or characters in the pseudo domain name database, and wherein the target domain name analysis unit communicates to the phishing attack domain name generation unit each of the characters in the second-level domain name portion having a corresponding visually similar character or characters in the pseudo domain name database and an indication of which visually similar character or characters in the pseudo domain name database that corresponds to each character of the second-level domain name portion of the target domain name.

* * * * *